United States Patent Office 2,852,773
Patented Sept. 16, 1958

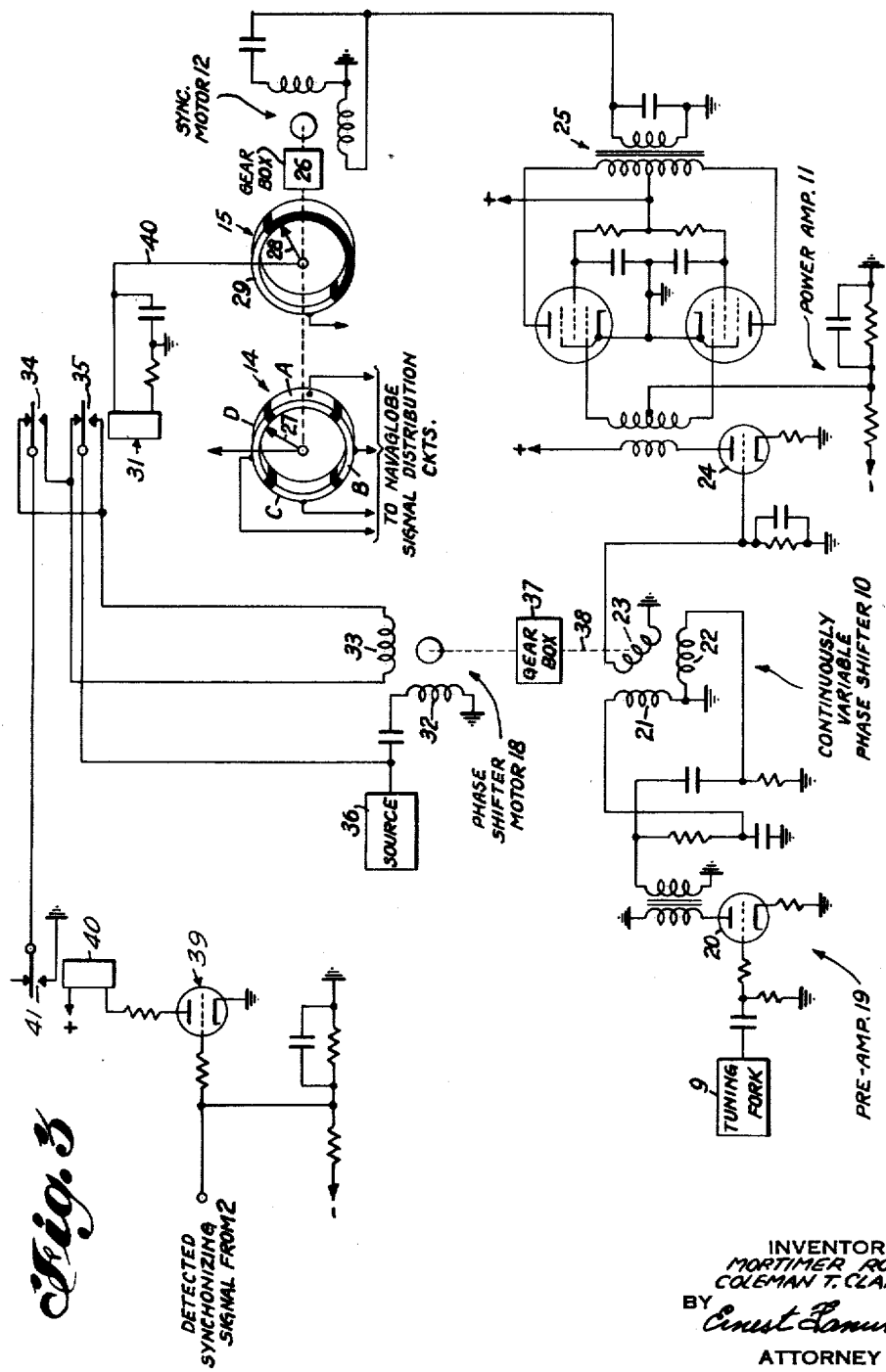

2,852,773

NAVIGATION RECEIVING SYSTEM

Mortimer Rogoff, Nutley, and Coleman T. Clark II, Livingston, N. J., assignors to International Telephone and Telegraph Corporation, Nutley, N. J., a corporation of Maryland Application February 28, 1955, Serial No. 491,081

4 Claims. (Cl. 343—106)

This invention relates to radio navigation beacon receiver systems and more particularly to a mobile navigation receiver for use with the radio beacon systems of the Navaglobe type.

There has heretofore been proposed radio navigation beacon systems which are extremely reliable over long distances. Such types of systems, for example, have been disclosed in U. S. Patent No. 2,541,040 entitled, "Radio Range Beacon," issued to R. I. Colin and in the copending patent application of P. R. Adams-B. Alexander-R. I. Colin Serial No. 382,934, filed September 29, 1953, entitled, "Aerial Navigation Indicator," and in the copending patent application of M. Dishal-M. Rogoff, entitled "Aerial Navigation Beacon System" Serial No. 491,082, filed February 28, 1955 and assigned to the same assignee as this application. In this general type of radio navigation system known as Navaglobe, it has been shown that very high reliability with reasonable power consumption can be expected. In these Navaglobe radio beacon systems the ground beacon portion consists essentially of three transmitting antennas arranged in an equilateral triangle which are successively energized in pairs so that differently directed radiation patterns are produced in different angular sectors omnidirectionally about the beacon. An omnidirectional signal is transmitted at the beginning of each cycle to provide a synchronizing signal to identify the bearing signals due to the energization of the antennas cophasally in pairs. In the previous receivers designed to cooperate with such beacons the bearing and synchronizing signals were detected at the mobile location and the synchronizing signal was utilized to control the distribution of the bearing signal energies so that the successively received energies were correctly applied in sequence to the bearing determining and indicating apparatus. The three bearing information signals were of course identified by virtue of their time positions with respect to the synchronizing signal. Observation of the performance of the previous synchronizing circuits in the presence of atmospheric noise reveals that such prior art receiver equipment is able to maintain synchronization approximately 90% of the time when the signal-to-noise ratio is in the order of 1:5. The synchronization was revealed to be vulnerable to heavy bursts of atmospheric noise when these bursts occurred with sufficient frequency and thus the equipment was placed in a continuous state of search for the proper synchronization. Previous synchronizing circuits were most efficient when the noise was of a thermal variety where the root-mean-square noise voltage was constant and the probability of noise peaks exceeding two or three times this value were exceedingly remote. Since the statistics of atmospheric noise do not present a constant R. M. S. value and very often the peak values of this noise are many times greater than its corresponding R. M. S., the synchronizing circuits were not entirely satisfactory when the input signals were contaminated with bursts of atmospheric noise. Further investigation has revealed that the character of atmospheric noise is such as to permit reception of the transmitted signals from time to time, for example, when an atmospheric storm is some 300–500 miles away from the receiving location the bursts of noise will be rather infrequent occurring as little as once a minute, and as the storm gets closer to the receiving location these noise bursts occur with increasing frequency and simultaneously the background noise grows in intensity. When the receiving equipment is centered in the storm area, the bursts and background noise are indistinguishable, providing conditions of noise interference many times more powerful than the received signals, thus completely blocking reception. As the storm moves away from the receiver, the frequency of the noise bursts and the magnitude of the background noise level recedes. Thus it is realized that the problem of maintaining synchronization at all times under these conditions is extremely difficult.

One of the objects of this invention is to provide an improved beacon system receiver which is relatively immune to the effects of noise bursts for a predetermined interval of time.

Another object of this invention is to provide an improved receiving system in which synchronization is derived locally from a very stable source which derives its phasing information from the transmitted signal.

A further object of this invention is to provide an improved receiving system in which the transmitted synchronizing signal is used to vary the phase of the output of a highly stable oscillator so that the timing of the distribution circuitry occurs in coincidence with the ground transmission cycle.

One of the features of this invention is the provision of a receiver having means to locally generate a control signal to identify and distribute the detected bearing signals to azimuth determining means and providing means to synchronize the control signal with the detected synchronizing signals.

Another feature of this invention is the provision of an improved receiving system in which the synchronizing signal controlling the timing distributor is derived locally from a very stable oscillator and the output of this very stable local oscillator is compared with the incoming detected synchronizing signal in a phase comparator system when the signal-to-noise ratio of the incoming signal is favorable and this comparison is utilized to shift the phase of the output of the very stable local oscillator.

The above-mentioned and other features and objects of this invention will become more apparent by reference to the following description taken in conjunction with the accompanying drawings, in which:

Fig 3 is a schematic circuit diagram of the synchronizing circuit shown in Fig. 2; and, Fig. 4 is a series of curves helpful in the explanation of the operation of the circuit shown in Fig. 3.

Figure 1:
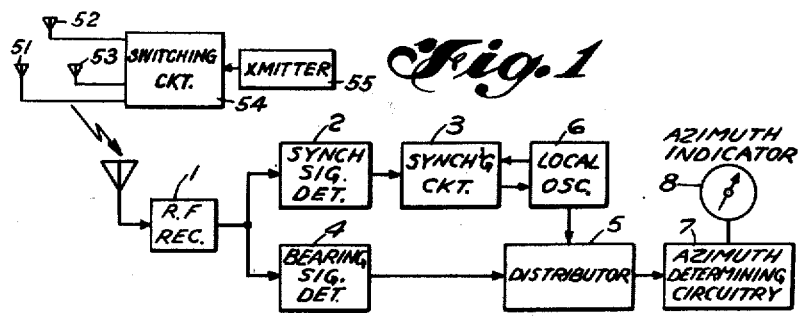
Fig. 1 is a schematic diagram in block form of one embodiment of a Navaglobe system.

Referring to Fig. 1 of the drawing, a schematic diagram in block form of one embodiment of a system is shown to comprise a Navaglobe beacon including three antennas 51, 52, and 53 coupled through a switching circuit 54 to a transmitter 55 and a receiver having a radio frequency receiving portion 1 which detects the signals emitted by a transmitting beacon. The output of the radio frequency receiving portion 1 is coupled to a synchronizing signal detector circuit 2 which couples the detected synchronizing signal to the synchronizing circuit 3 of the receiving system. Simultaneously, the output of the radio frequency receiver portion 1 is coupled to the bearing signal detector circuit 4 and the output of the bearing signal detector 4 is coupled to distributor 5. The output of a stable local oscillator 6 controls the operation of the distributor 5 and also has the phase of its output coupled to and controlled by the output of the synchronizing circuit 3. In the synchronizing circuit 3 the detected synchronizing signal is compared with the output of the local oscillator 6 and a control signal is coupled to the local oscillator circuit 6 to maintain synchronization between the output of the local oscillator 6 and the detected synchronizing signal. The output of the bearing signal detector 4 is coupled to the azimuth indicator equipment 7 in proper relation due to the operation of distributor 5.

It is, of course, assumed that one skilled in the art of aerial navigation systems is aware that the Navaglobe transmitter or ground beacon radiates a cycle of three successive signals from a directional antenna array by energizing three antennas cophasally in pairs in succession. A fourth signal is radiated omnidirectionally as a synchronizing signal to indicate the start of each cycle. The relative amplitudes of the three bearing signals depend upon the relative bearing of the receiving site from the transmitter. In the receiver as indicated in Fig. 1, the signals are picked up by an antenna, amplified in the radio frequency receiver 1 and supplied to an indicator equipment after being coupled to an azimuth determining unit 7 where the signals are identified and measured with respect to relative amplitude. Since Navaglobe is a time sequential system, the received signals must be properly routed to the correct circuits of the azimuth indicator equipment 8, and any interruption in this routing or improper sequencing of distribution produces bearing errors. It is to overcome these bearing errors that the synchronizing circuit of this invention was developed for use in a Navaglobe receiving system.

Figure 2:
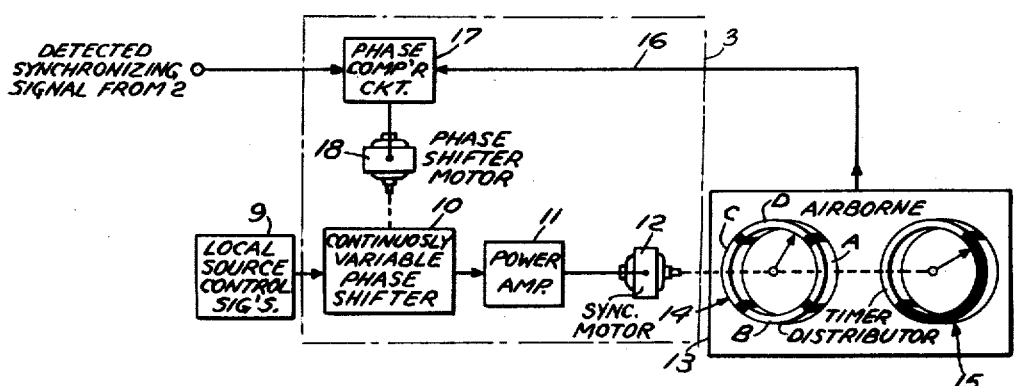
Fig. 2 is a schematic diagram in block form of one embodiment of a synchronizing circuit together with the associated local oscillator and distributor in accordance with the principles of this invention for use in the receiving system shown in Fig. 1.

Referring to Fig. 2 of the drawing, which gives further details of the portion of Fig. 1 including the local oscillator 6, synchronizing circuit 3, and distributor 5, an extremely stable local oscillator such as a tuning fork oscillator 9, corresponding to local oscillator 6 of Fig. 1, produces an output signal having a frequency equal to or a multiple of the pulse frequency of the Navaglobe cycle. Thus, if the total basic cycle is one second long comprising three bearing pulses and one synchronizing pulse the output of the tuning fork oscillator 9 may comprise a signal at 400 C. P. S. which is coupled to a continuously variable 400 cycle per second phase shifter circuit 10. The output of phase shifter 10 is coupled through amplifier 11 to operate the synchronous motor 12. The shaft of the synchronous motor 12 is coupled to the timing distributor 13 comprising distributor portion 14, corresponding to distributor 5 of Fig. 1, and timer portion 15. A signal indicative of the phasing of the distributor 13 is coupled over line 16 to a phase comparator circuit 17 whose other input comprises the detected synchronizing signal from the detector circuit 2 shown in Fig. 1. The output of the phase comparator circuit 17 controls the phase shifter motor 18 which is mechanically coupled to the continuously variable 400 C. P. S. phase shifter 10. When the timing cycle derived from the tuning fork oscillator 9 is in synchronism with the detected synchronizing signal, phase shifter 10 is set at zero phase shift by the phase shifter motor 18 since there is no effective output from the comparator circuit 17. However, should the local oscillator 9 drift from synchronism, then there is an error signal output from the comparator circuit 17 which causes the phase shifter motor 18 to vary the phase shifter 10 and cause the input to the timing distributor circuit 13 to be in synchronism with the synchronizing signal. If the tuning fork oscillator 9 has a long time stability such as, for example, 30 minutes or more, which is presently obtainable with oscillators known in the present state of the art, then it is obvious that the receiver system utilizing the principles of this invention is able to operate for a period of time equal to the stability of the oscillator even though the synchronizing signal is lost due to noise or other atmospheric conditions.

Referring to Fig. 3 of the drawing, a schematic circuit diagram of the synchronizing circuit of this invention together with the associated local oscillator and distributor is shown wherein the output of the tuning fork oscillator 9 is coupled to a pre-amplifier circuit 19 including electron discharge device 20 which has its output taken from the plate circuit and coupled to the field windings 21 and 22 of the continuously variable 400 C. P. S. phase shifter 10. The output of the rotor 23 of the phase shifter 10 is coupled as the input to the electron discharge device 24 contained in the 400 C. P. S. power amplifier circuit 11. The output of the power amplifier 11 is coupled through transformer 25 to the 400 C. P. S. synchronous motor 12. The output of the synchronous motor 12 is coupled through gear box 26 to control the rotation of the brushes 27 and 28 on the timer and distributor 14 and 15. Assuming that the timer 15 is in synchronism with the incoming synchronizing signals from the ground transmitter, as detected in circuit 2 of Fig. 1 then the "A" portion of the distributor will be in contact with the brush 27 during the period of time that the "A" bearing signal is being received from the ground transmitter, and this is true of the "B," "C," and "S" or synchronizing periods. By having the detected bearing signals "A," "B" and "C" coupled through the distributor 14 to the bearing indicator circuitry 7, it is obvious that when the distributor is in synchronism with the received signals they will be identified as being transmitted by a particular pair of transmitting antennas. Mechanically mounted on the same shaft and driven from the same source as distributor 14 is timer 15 comprising contact portion 29 and brush 28. When brush 27 is in the exact center of the synchronizing signal portion "S," then the brush 28 is caused to pass from the insulating portion 30 of the timer 15 to the conductive part 29. When the brush 28 is in contact with the conductive part 29 of the timer 15, a source of direct potential is applied to the relay coil 31 causing the armatures 34 and 35 of the relay to move to the lower position, causing the voltage source 36 having a predetermined polarity to be coupled to the winding 33 of the phase shifter motor 18 in such a manner as to cause a rotation in a given direction to be transmitted through gears 37 and coupling 38 to the rotor 23 of the phase shifter 10. When the relay coil 31 is in the de-energized position and the relay contacts are in the upper position, it is seen that the energy flow from source 36 coupled to the winding 33 of the phase shifter motor 18 is reversed causing a reversal in the rotary movement coupled to rotor 23 of phase shifter 10.

The incoming detected synchronizing signal is coupled to an amplifier 39 having a relay coil 40 in its plate circuit. During a portion of the detected synchronizing signal, current flows in the plate circuit and thus in the relay coil 40 causing the relay armature 41 to be coupled to the lower position, allowing current to flow in the field coil 33 of the phase shifter motor 18. It is of course obvious that current will flow in winding 33 only when the armature 39 is connected to ground.

Figure 4:
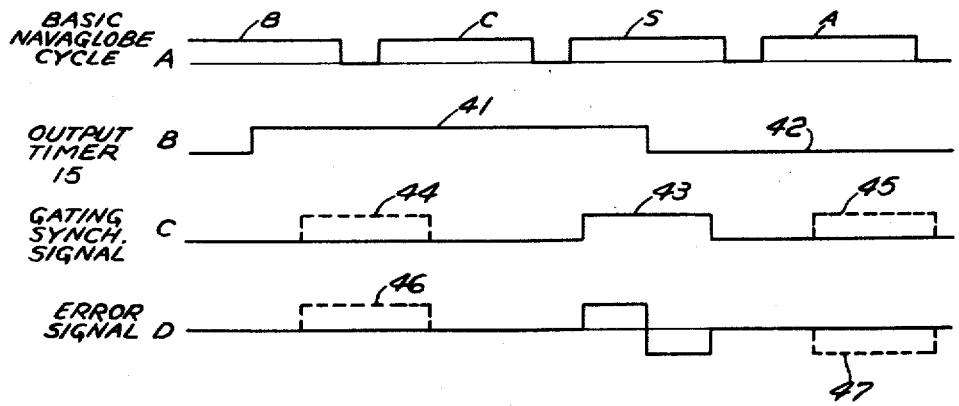

Referring now to Fig. 4 of the drawings, the curves therein illustrated are helpful in the explanation of the operation of the synchronizing circuit of this invention. The basic transmission cycle of the Navaglobe system, as shown in curve A, Fig. 4, is seen to comprise three bearing signal pulses "A," "B" and "C" and a synchronizing signal pulse "S." As previously explained, the output of the timer portion 15 causes a positive voltage to be coupled over line 40 during the one-half the cycle when the brush 28 is in contact with the conductive portion 29 as indicated by the portion 41 of curve B, Fig. 4, and during the other half the cycle when brush 28 is in contact with part 30, no potential is coupled over line 40 as indicated by portion 42 of curve B. Relay 38, responsive to the detected synchronizing signal and due to the circuit characteristics operates only during a portion of the time of reception of the synchronizing signal "S" as indicated by pulse 43, shown in curve C, Fig. 4. The pulse 43 as shown in curve C, Fig. 4 straddles the change in polarity of curve B, Fig. 4, when the incoming detected synchronizing signal "S" is exactly in phase with the output of the local oscillator 9.

The error signal shown in curve D, Fig. 4 coupled to the phase shifter motor 18 is of positive polarity for one-half of the gated period and of negative polarity for the remainder of the period. When the incoming detected synchronizing signal "S" is out of phase with the output of the local oscillator 9 then the timing of the gating synchronizing signal as shown by pulses 44 and 45, curve C, Fig. 4 leads or lags the change in polarity of curve B, Fig. 4 and the error signal generated is of one polarity during the entire period as shown by pulses 46 and 47 in curve D, Fig. 4.

While we have described above the principles of our invention in connection with specific apparatus, it is to be clearly understood that this description is made only by way of example and not as a limitation to the scope of our invention as set forth in the objects thereof and in the accompanying claims.

We claim:

1. In a navigation system wherein a plurality of differently directed azimuth bearing signals and a synchronizing signal are transmitted in sequence from a beacon, a navigation receiver comprising means to detect said bearing signals, means at said receiver to generate a control signal, means responsive to said control signal to identify and distribute said bearing signals, means reesponsive to said identified and distributed bearing signals to determine the azimuth of said receiver relative to the location of said beacon, means to detect said transmitted synchronizing signal, comparison means to compare the phase of said control signal and the phase of said detected synchronizing signal and means to adjust the phase of the output of said control signal generator means responsive to said comparison means.

2. A radio receiver system responding to radio energy of a predetermined frequency having a cyclic character and including a synchronizing signal and energy of different energy levels at different time intervals comprising means for receiving said energy, a gate circuit, means for detecting said synchronizing signal, means for producing gate control signals in response to said detected synchronizing signals, means for applying said gate control signals to said gate circuit, means to determine bearing responsive to said signals at different energy levels, means for distributing said different energy level signals to said bearing determining means responsive to said gate control signals, comparison means for comparing the phase of said gate control signals with the phase of said detected synchronizing signals during said gating periods, and means for adjusting the phase of said gate control signals responsive to the output of said comparison means.

3. In a radio beacon system having a beacon which cyclically and successively transmits bearing signals in a plurality of differently directed radiation patterns and a synchronizing signal, an indicating receiver comprising means for detecting said differently directed radiation pattern bearing signals, bearing indication means responsive to said detected bearing signals, distributor means for coupling said bearing signal energy defining the different radiation patterns to said bearing indicating device, means for generating a control signal, means for coupling said control signal to said distributor, means to control the coupling of said bearing signal energy to said indicating device, phase shifter means to adjust the phase of said control signal, means to detect said synchronizing signal, comparison means to compare the phase of said control signal to the phase of said detected synchronizing signal, and means responsive to the output of said comparison means to adjust said phase shifter means.

4. In a radio beacon system having a beacon which cyclically and successively transmits bearing signals in a plurality of differently directed radiation patterns and a synchronizing signal, an indicating receiver comprising means for detecting said differently directed radiation pattern bearing signals, bearing indication means responsive to said detected bearing signals, distributor means for coupling said bearing signal energy defining the different radiation patterns to said bearing indicating device, means for generating a control signal, means for coupling said control signal to said distributor, means to control the coupling of said bearing signal energy to said indicating device, phase shifter to adjust the phase of said control signal, means to detect said synchronizing signal, comparison means to compare the phase of said control signal and said detected synchronizing signal, motor means responsive to the output of said comparison means, means to couple the output of said motor means to said phase shifter to control the adjustment thereof, means to develop a gate signal responsive to said detected synchronizing signal, means to couple a voltage of predetermined polarity during said gate signal period to said motor means, and means responsive to the time of occurrence of the midpoint of said detected synchronizing signal to reverse said predetermined polarity.

No references cited.